United States Patent [19]

Gibbs et al.

[11] Patent Number: 4,731,551
[45] Date of Patent: Mar. 15, 1988

[54] TIMED AUXILIARY POWER ADAPTER

[75] Inventors: Thomas J. Gibbs, Pomona; Richard L. Finley, Placentia; Michael G. Canavan, Highland, all of Calif.

[73] Assignee: Southern California Edison, Inc., Rosemead, Calif.

[21] Appl. No.: 928,536

[22] Filed: Nov. 7, 1986

[51] Int. Cl.⁴ .................. H01H 7/00; H05B 37/02; H01J 5/02
[52] U.S. Cl. .................. 307/141; 307/141.4; 307/139; 307/140; 315/159; 250/214 AL; 250/239
[58] Field of Search ............ 307/141, 141.4, 139, 307/140, 11, 12, 38, 157; 315/159, 179, 360, 250, 312, 313; 250/214 AL, 206, 239, 214 R

[56] References Cited

U.S. PATENT DOCUMENTS

| | | | |
|---|---|---|---|
| 3,048,833 | 8/1962 | Bernheim | 315/159 |
| 3,056,035 | 9/1962 | Bernheim | 250/214 AL |
| 3,401,265 | 9/1968 | Dotto | 315/159 |
| 3,673,413 | 6/1972 | Lee | 250/206 |
| 4,023,035 | 5/1977 | Rodriguez | 250/239 |
| 4,209,728 | 6/1980 | Membreno | 315/159 |
| 4,237,377 | 12/1980 | Sansum | 250/214 R |
| 4,362,970 | 12/1982 | Grady | 315/159 |

Primary Examiner—William M. Shoop, Jr.
Assistant Examiner—Sharon D. Logan
Attorney, Agent, or Firm—Sheldon & Mak

[57] ABSTRACT

A power adapter for timed control of auxiliary electrical loads is provided for connection between a streetlight fixture or the like and a control module of the fixture. The adapter has a weather-resistant housing and an electrical jumper in the housing extending a power source connection to an input of the module, another jumper returning a control output from the module to a main load of the fixture. An auxiliary socket at the side of the housing powers the auxiliary load, which can be a holiday lighting display. In one version, the adapter has a clock timer for controlling the auxiliary load independently of the main load. In another version, a programmable delay timer, synchronized with commencement of main load operation, terminates operation of the auxiliary load following a predetermined interval of main load operation.

10 Claims, 10 Drawing Figures

TIMED AUXILIARY POWER ADAPTER

BACKGROUND

The present invention relates to cyclically activated electrical fixtures, and more particularly to an adapter for powering and controlling an auxiliary load from existing automatic street luminaries and the like.

Temporary or auxiliary electrical loads such as holiday lighting displays are frequently used in association with street light fixtures. In many cases, the auxiliary loads must be powered separately from the fixtures, there being no provision for powering auxiliary devices directly from the fixtures. Thus a private party or a governmental agency desiring to provide such a display is often faced with expensive requirements for temporary power poles, safety socket boxes, wiring and conduits.

Thus there is a need for apparatus permitting an auxiliary load to be powered directly from existing lighting fixtures. There is a further need that the apparatus provide timed control of the auxiliary load.

SUMMARY

The present invention meets this need by providing an adapter for connection between a control module and the structure of a lighting fixture. In one configuration, the apparatus includes a housing for mounting between the structure and the module, means for extending a source of electrical power from the structure to the module, means for returning a control output from the module to a main load in the fixture, and means for connecting the auxiliary load to the source of power. The apparatus includes means for interrupting the connecting means during a predetermined period of time in each cycle of operation of the main load. Thus the auxiliary load can be operated in an automatic cycle that is not required to duplicate the timing of the main load.

A first plug on the module can engage a second socket on the housing and a second plug on the housing can engage a first socket on the structure, the extension and returning means including respective conductors connected between the second plug and the second socket.

In one version of the present invention, the interrupting means includes a continuously running clock timer. The clock timer allows the auxiliary load to be programmed independently of the main load of operation.

In another version of the present invention, the interrupting means is connected to the control output of the module for preventing operation of the auxiliary load except during operation of the main load. Preferably the interrupting means includes a delay timer for interrupting the connecting means commencing at a predetermined period after the beginning of main load operation. In this version, the operation of the auxiliary load is automatically synchronized with the main load such that an interruption of power at the source does not require the apparatus to be reprogrammed.

The present invention also provides a method for powering and controlling an auxiliary load from the fixture, comprising the steps of:

(a) selecting an apparatus including a housing, a second socket on the housing for engaging the first plug, a second plug on the housing for engaging the the first socket, a first conductor for conducting the source of power from the second plug to the second socket, a second conductor for conducting the main load from the second socket to the second plug, an auxiliary socket on the housing and connected between the first and second conductors, and means for interrupting the connection to the auxiliary socket during a predetermined period of time in each cycle;

(b) removing the control module from the fixture;

(c) attaching the apparatus to the fixture by connecting the second plug to the first socket;

(d) attaching the control module to the apparatus by connecting the first plug to the second socket; and (e) connecting the auxiliary load to the auxiliary socket.

DRAWINGS

These and other features, aspects, and advantages of the present invention will become better understood with reference to the following description, appended claims, and accompanying drawings where:

FIG. 1 a fragmentary sectional elevational view of an adapter apparatus according to the present invention;

DESCRIPTION

Figure 4:
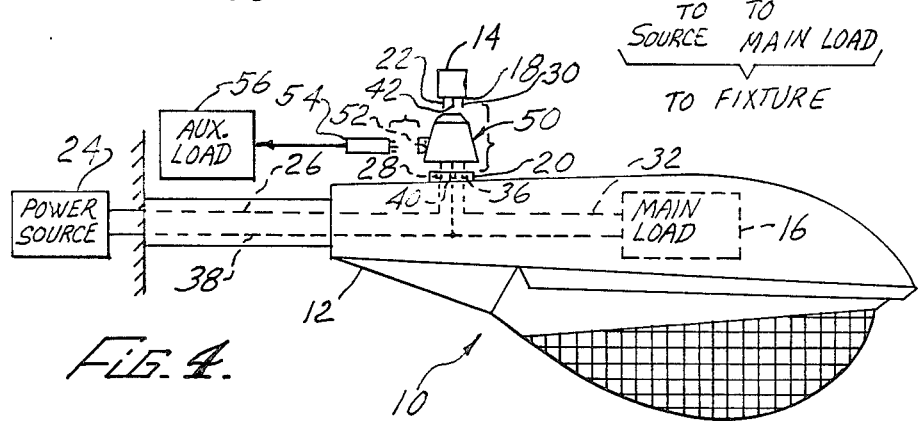
FIG. 4 is an exploded elevational view showing the apparatus of FIG. 1 in use with an automatic outdoor lighting fixture.

The present invention is directed to an apparatus for adapting an auxiliary load to an automatic lighting fixture. With reference to FIG. 4, a fixture 10 includes a structure 12 and a removable module 14 for controlling a main load 16 of the fixture 10. The module 14 has a module plug 18 for engagement with a fixture socket or receptacle 20 on the fixture 10, an input connection or pin 22 of the module plug 18 receiving 60 Hz AC power from a power source 24 through a source line 26, the source line 26 being connected to a source socket terminal 28 of the fixture receptacle 20. The power is automatically delivered from a control connection or pin 30 of the module plug 18 through a load line 32 to the main load 16, the load line 32 being connected to a load socket terminal 36 of the fixture receptacle 20. A fixture neutral line 38 provides a ground connection between the power source 24, the main load 16, and a neutral socket terminal 40 of the fixture receptacle 20, the module plug 18 having a corresponding ground pin 42 for grounding the module 14. Typically, the module plug 18 and the fixture receptacle 20 are three-terminal twist-lock type devices.

With further reference to FIGS. 2-5, and FIG. 9, the present invention provides an adapter 50 for connection between the module plug 18 of the module 14 and the fixture receptacle 20 of the fixture 10, the adapter 50 having an adapter socket 52 for connecting a power plug 54 of an auxiliary load 56.

The adapter socket 52 is sealingly mounted in a cylindrical recess 58 of a housing 60, the socket 52 being retained therein by a clamp nut 62 that threadingly engages the cylindrical recess 58. The housing 60 is connected to a protective cap 64 by a beaded chain 66. When the auxiliary load 56 is disconnected from the adapter 50, the cap 64 is used to plug the recess 58 for excluding water and the like from the adapter socket 52. A module socket 68 is sealingly mounted to the top of the housing 60 and clamped thereto by a clamp ring 70 for receiving the module plug 18 of the module 14. The module socket 68 has an input socket terminal 72, a control socket terminal 74, and a ground socket terminal 76 for engaging, respectively, the input pin 22, the control pin 30, and the ground pin 42 of the module plug 18.

Figure 5:
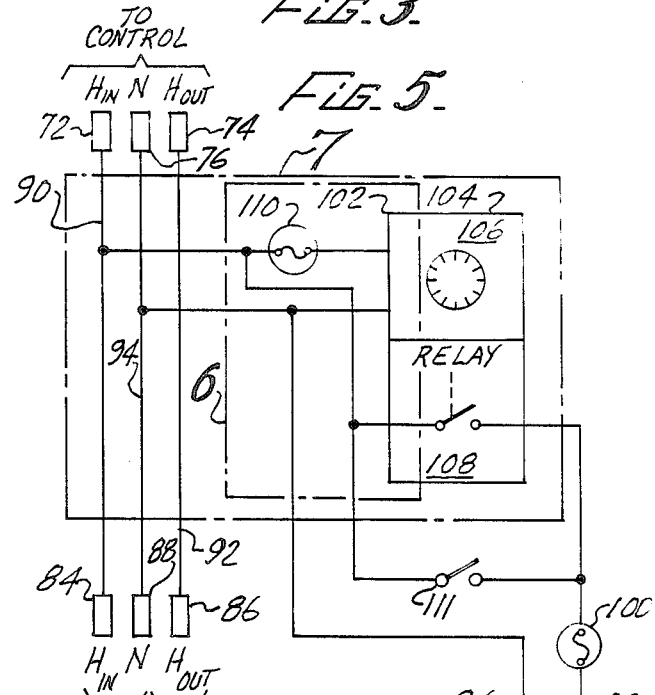
FIG. 5 is a schematic diagram of the apparatus of FIG. 1.

An adapter plug 78 for engaging the fixture socket 20 is sealingly mounted to the bottom of the housing 60 on a cover plate 80, the adapter plug 78 having a ring-shaped gasket 82 bonded thereto for sealing against the fixture receptacle 20 and excluding water and the like therefrom. The adapter plug 78 has a source pin 84, a load pin 86, and a neutral pin 88 for engaging, respectively, the source socket terminal 28, the load socket terminal 36, and the neutral socket terminal 40 of the fixture socket 20. As shown in FIG. 5, a power jumper 90 is connected between the source pin 84 and the input socket terminal 72 of the module socket 68 for extending the power from the source socket terminal 28 to the input pin 22 of the module 14. A control jumper 92 is connected between the load pin 86 and the control socket terminal 74 for returning the output of the module 14 from the control pin 30 to the load socket terminal 36. A ground jumper 94 is also connected between the neutral pin 88 and the ground socket terminal 76 of the module socket 68. Thus, when the adapter 50 is connected between the fixture socket 20 and the module plug 18, the source line 26, the load line 32, and the neutral line 38 are respectively connected to the input pin 22, the control pin 30, and the ground pin 42 of the module plug 18. The ground jumper 94 is also connected to a common socket terminal 96 of the adapter socket 52. An auxiliary socket terminal 98 of the adapter socket 52 is connected through a load fuse 100 to the power source 24 as described herein. Thus the auxiliary load 56 is powered by connecting the power plug 54 between the auxiliary socket terminal 98 and the common socket terminal 96.

The adapter 50 includes a timer means 102 for interrupting power to the auxiliary load 56 as described herein. In one version of the present invention, the timer means 102 is powered from the power jumper 90, the timer means 102 exercising exclusive control over the auxiliary load 56. The timer means 102 can be a continuously running clock timer 104 having a timer section 106 and a relay section 108. The timer section 106 is powered through a timer fuse 110 between the power jumper 90 and the ground jumper 94. The relay section 108 is connected between the load fuse 100 and the power jumper 90 for controlling the auxiliary load 56.

Thus the load fuse 100 can be sized for handling a relatively high current requirement of the auxiliary load 56 while the timer fuse 110 can safely have a lower capacity sufficient for driving the timer section 106.

Figure 6:
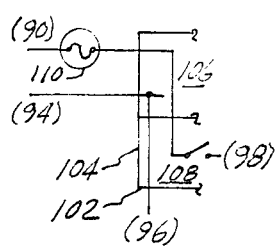
FIG. 6 is a schematic diagram showing an alternative configuration of the apparatus of FIG. 1 within region 6 of FIG. 5.

Alternatively, the clock timer 104 can have a single power circuit for both the timer section 106 and the relay section 108 as shown in FIG. 6, in which case the timer fuse 110 would be sized for driving both the auxiliary load 56 and the timer section 106, the load fuse 100 no longer being used. A bypass switch 111 is connected in parallel with the relay section 108 for bypassing the timer means 102 when it is desired to trouble-shoot the adapter 50 or to verify operation of the auxiliary load 56 when the timer means 102 is interrupting power to the auxiliary load 56.

Figure 1:
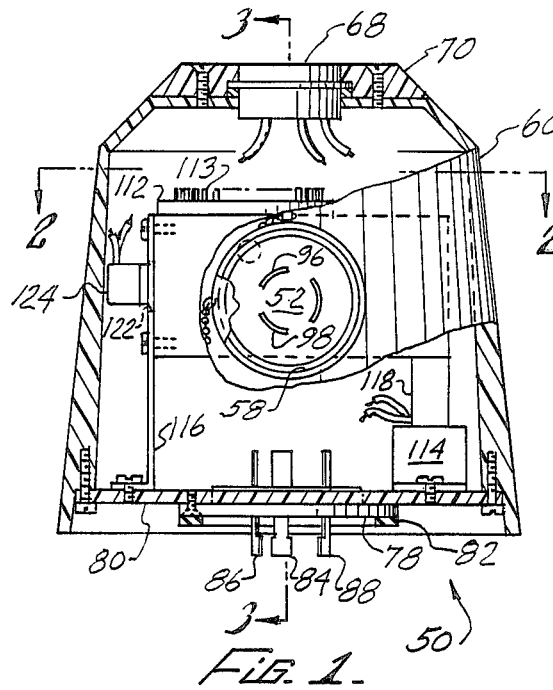
Figure 3:
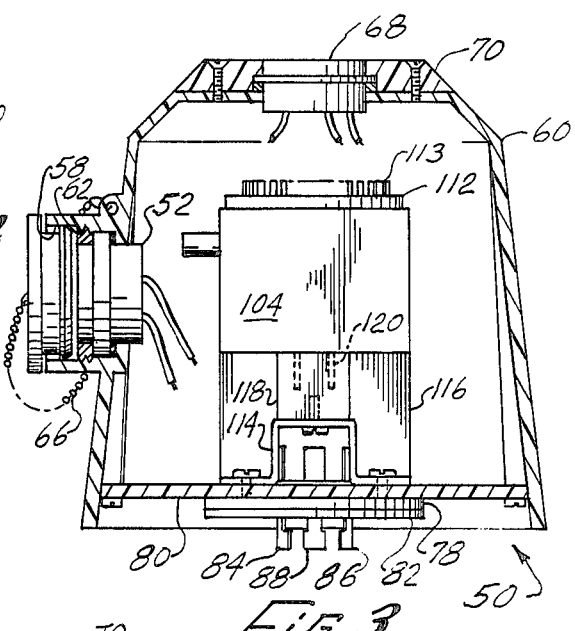
FIG. 3 is a fragmentary sectional elevational view of the apparatus of FIG. 1 along line 3—3 in FIG. 1.
Figure 2:
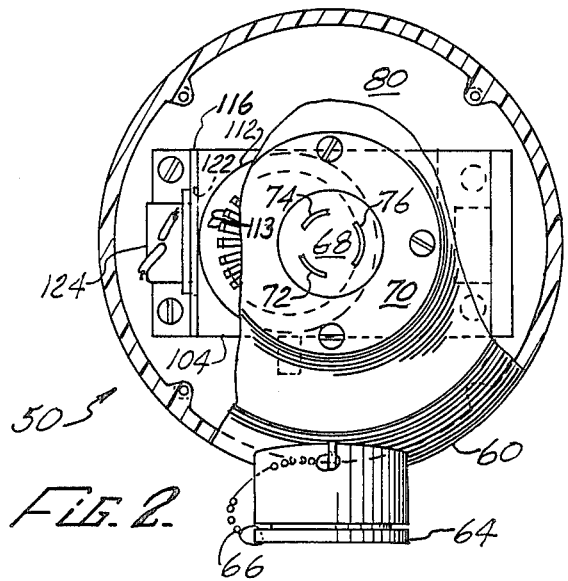
FIG. 2 is a fragmentary sectional plan view of the apparatus of FIG. 1 along line 2—2 in FIG. 1.

A suitable clock timer 104 for the adapter 50 is an electromechanical device, available as a model D-811 appliance timer from Intermatic, Inc., Spring Grove, Ill. As shown in FIGS. 1-3, the clock timer 104 has a rotatably mounted setting ring 112 for synchronizing the timer section 106 with a known time of day, and a plurality of programming slides 112 for defining the period of time during which the relay section 108 is to be energized. The clock timer 104 is supported within the housing 60 above the cover plate 80 on a socket bracket 114 and a plug bracket 116. A socket 118 mounted to the socket bracket 114 receives a pair of power pins 120 extending from the clock timer 104 for powering the clock timer 104 as described above. The plug bracket 116 is fastened directly to the clock timer 104, the plug bracket 116 having a plug aperture 122 for permitting a load plug 124 to have access for connecting a load socket 126 of the clock timer 104. Electrical connections to the load fuse 100 and the adapter socket 52 are made from the load plug 24.

Figure 8:
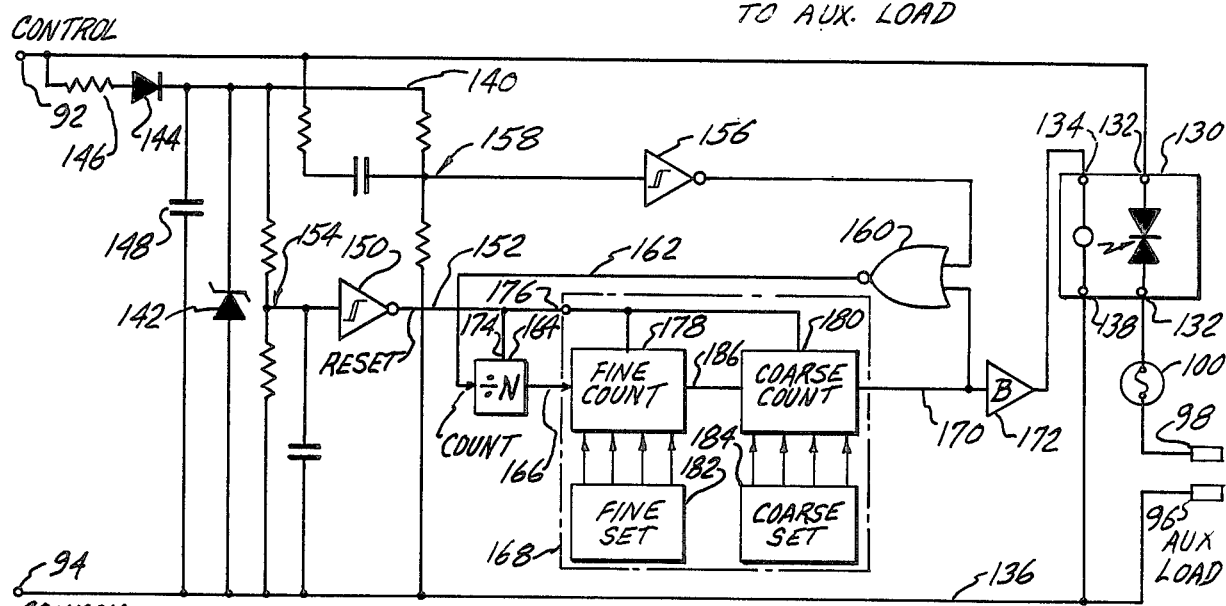
FIG. 8 is a schematic diagram showing an electronic implementation of the configuration of FIG. 7 within region 8 therein.

Typically, the main load 16 is a luminaire ballast circuit that is operated at night, the module 14 having a photo-detector (not shown) for sensing a reduced ambient light level associated with a need for illumination by the fixture 10. Thus, as shown in FIG. 8, the main load 16 is operated in a daily cycle for a period on the order of 10 to 14 hours in duration. It is usually desired, however, that the auxiliary load 56 be operated for a shorter period. For example, if the auxiliary load is a holiday display, it may be desired to extinguish the display at a predetermined time of day one or two hours after the local businesses have closed. Similarly, it may be desired to operate the display commencing at a time earlier than the time that operation of the main load commences. The clock timer 104 is set to local clock time (referenced to midnight, for example, in FIG. 9) and programmed in a conventional manner for defining a period of operation, once per day, designated auxiliary interval 127 in FIG. 9, for the auxiliary load 56. Both the beginning and end of the interval 127 are set to predetermined times of day. Accordingly, this configuration of the present invention provides that the operation of the auxiliary load 56 can be timed independently of the operation of the main load 16.

Figure 7:
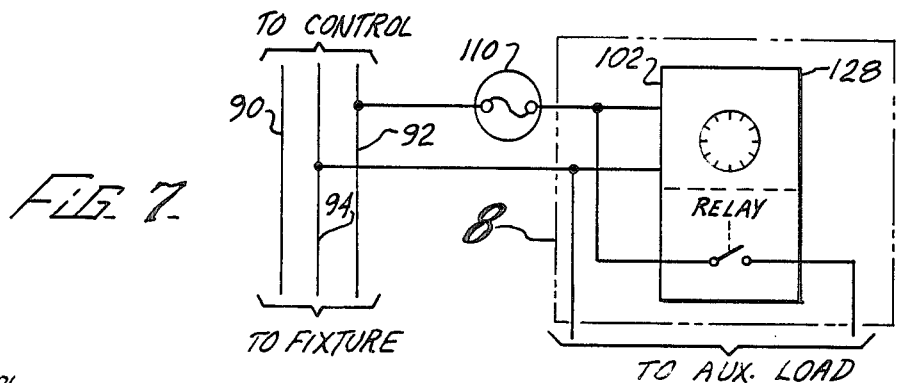
FIG. 7 is a schematic diagram showing an alternative configuration of the apparatus of FIG. 1 within region 7 of FIG. 5.
Figure 10:
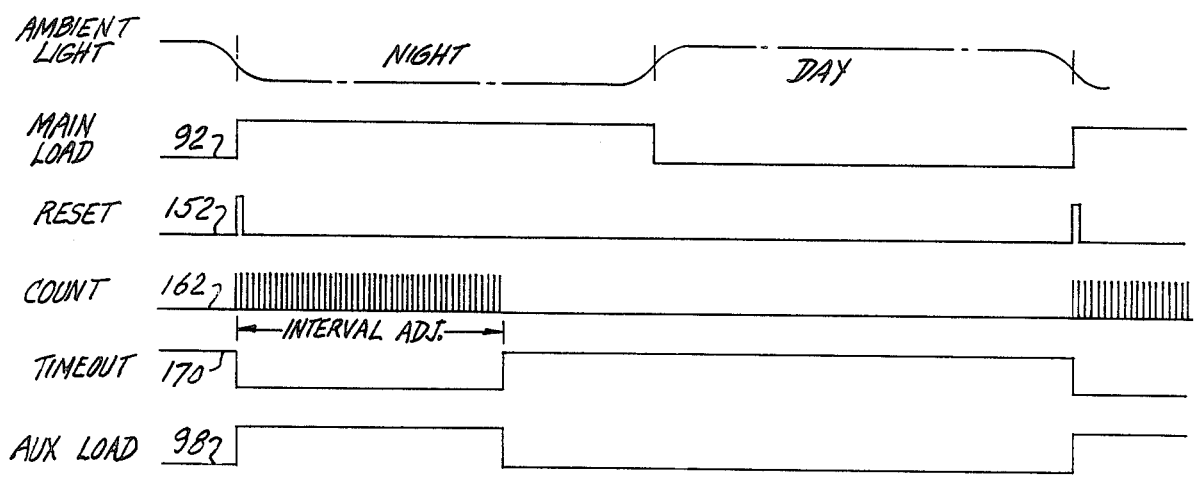
FIG. 10 is a timing diagram showing the operation of the alternative configuration of the apparatus of FIG. 7 as implemented in FIG. 8.
Figure 9:
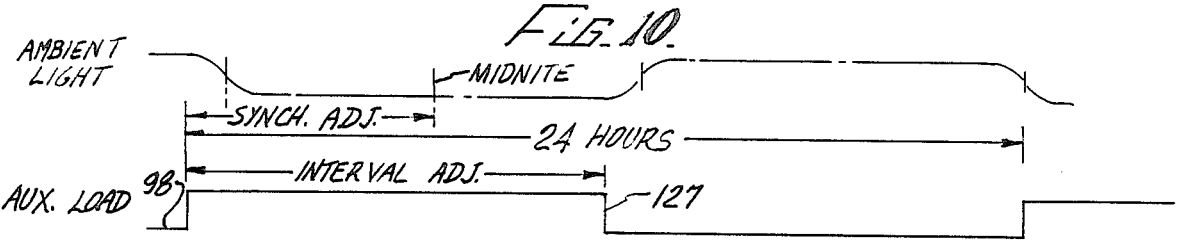
FIG. 9 is a timing diagram of the apparatus of FIG. 1.

In another version of the present invention shown schematically in FIG. 7, the timer means 102 is powered from the control jumper 92 for preventing operation of the auxiliary load 56 except when the main load 16 is being operated by the module 14. In this version, the timer means 102 can be a delay timer 128. The delay timer 128, being automatically reset once in each cycle of operation of the main load 16 as described herein, is automatically synchronized with the commencement of operation of the main load 16 as shown in FIG. 10. The delay timer 128 can be constructed as an electromechanical device, packaged similarly to the clock timer 104 when it is implemented as an electromechanical device as described above. The timer means 102 can also be implemented as an electronic device. In the version of the adapter 50 shown schematically in FIG. 7, an exemplary electronic implementation of the delay timer 128 is as shown schematically in FIG. 8. The delay timer 128 includes, as a counterpart of the relay section 108, a solid-state relay module 130 which can be one of any number of commercially available devices.

The delay timer 128 operates by counting a predetermined number of cycles of the 60 Hz power that is provided on the control jumper 92 when the module 14 is driving the main load 16. The relay module 130 has a pair of power terminals 132 that are connected in series between the control jumper 92 and the auxiliary socket terminal 98, along with the load fuse 100. The power terminals 132 are connected within the relay module 130 by through a triac or similar device, the triac being connected by appropriate interface circuitry (not shown) to a logic input 134 for selectively controlling the triac between a conducting state and a non-conducting state, the logic input 134 being referenced to a logic ground 136 by a relay ground 138. The logic ground 136 is connected to the ground jumper 94. Logic power at a convenient DC voltage is provided on a power bus 140 by a zener diode 142, the zener diode 142 being driven through a rectifier diode 144 and a dropping resistor 146 from the control jumper 92. A filter capacitor 148 is connected across the zener diode 142 to the logic ground 136 for smoothing the voltage on the power bus 140.

A schmitt trigger or reset amplifier 150 provides a reset signal 152 when the power bus 140 is rising toward the DC voltage upon activation of the control jumper 92 by the module 14. For this purpose, an integrating network 154, connected between the power bus 140 and the logic ground 136, provides delayed application of a trigger voltage level to the reset amplifier 150. The reset amplifier 150, and other components of the delay timer 128 described herein, are powered by appropriate connections (not shown) to the power bus 140 and the logic ground 136.

Another schmitt trigger or a count amplifier 156 is connected to the control jumper 92 through a differentiating network 158 for producing pulses corresponding to the 60 Hz of the power source 24 when the control jumper 92 is activated by the module 14. The count amplifier 156 is connected through a NOR or other appropriate gate circuit 160 for producing a 60 Hz count signal 162 when the gate circuit 160 is enabled as described herein.

The count signal 162 is directed to a modulo-N counter or divider circuit 164 for producing a carry or minute signal 166 for driving a delay counter 168, the delay counter 168 producing a timeout signal 170 after a predetermined number of pulses from the minute signal 166. The timeout signal 170, amplified by a buffer 172, controls the logic input 134 of the relay module 130 so that the auxiliary load 56 is energized by a false or reset condition and extinguished by a true condition of the timeout signal 170. The reset signal 152 is connected to a reset input 174 of the divider circuit 164 and a load input 176 of the delay counter 168 for resetting the divider circuit 164 and programming the delay counter 168 at the commencement of operation of the main load 16. Also, the gate circuit 160 is enabled by the reset condition of the timeout signal 170, terminating the count signal 162 for latching the true condition of the timeout signal 170. Thus, when the control jumper 92 is activated by the module 14, the divider circuit 164 is reset and the delay counter 168 is programmed by the reset signal 162, producing the reset condition of the timeout signal 170 and energizing the relay module 130, turning on the auxiliary load 56. The auxiliary load 56 remains on until the timeout signal 170 goes true after the predetermined programmed interval of the delay counter 168, or until the main load 16 is de-energized by the module 14 interrupting power to the control jumper 92.

As shown in FIG. 8, the delay counter 168 is implemented in two stages, including a fine counter 178 and a coarse counter 180, each being connected to the load input 176 for receiving the reset signal 152. A fine set means 182 is associated with the fine counter 178 and a coarse set means 184 is associated with the coarse counter 180 for presenting predetermined values to which the fine counter 178 and the coarse counter 180 are set when the reset signal 152 is received at the load input 176. A carry or hour signal 186 from the fine counter 178 drives the coarse counter 180.

The divider circuit 164, the coarse counter 178, and the fine counter 180 can be scaled for convenient programming by the fine set means 182 and the coarse set means 182 in several ways, depending on a desired range and resolution of the programmed interval. For example, if the modulus N of the divider circuit 164 is 3600, the minute signal 166 cycles once per minute of time. Also, if the fine counter 178 operates modulo-60, the hour signal 186 cycles once per hour of time, after an initial cycle thereof that is dependent on the number from the fine set means 182. Thus the delay counter 168 is programmed by setting the coarse set means 184 to a desired number of hours and the fine set means to a desired number of minutes in the programmed interval. The fine set means 182 and the coarse set means 184 can be conventionally coded, commercially available thumbwheel switch assemblies, either of sealed construction or accessable upon separation of the housing 60 from the cover plate 80. In another example, the modulus N is 21,600 and the fine counter operates modulo 10, the minute signal 166 cycles once every six minutes, the hour signal 186 again cycling once per hour. In this example, if implemented with thumbwheel switches as described above, permits a single digit for each of the fine set means 182 and the coarse set means 184 to provide ten hours of programming at a fairly fine interval resolution of six minutes. In a further example, the modulus N is 108,000 and the divider circuit 164 drives the coarse counter 180 directly, bypassing the fine counter 178, the coarse set means being implemented by a single hexadecimal thumbwheel switch. Thus the single thumbwheel provides eight hours of programming at a reasonable interval resolution of thirty minutes.

The delay timer 128 can advantageously be implemented using the commercially available CMOS logic family that consumes very little electrical power and is tolerant of a wide voltage range of the power bus 140 (3 volts to 15 volts, for example). Thus only a small amount of heat is dissipated from the dropping resitor 146, even though a low voltage transformer is not used to drop the line voltage from the source 24.

Although the present invention has been described in considerable detail with reference to certain preferred versions thereof, other versions are possible. For example, the clock timer 104 can be implemented electronically using circuitry similar to the delay timer 128. Therefore, the spirit and scope of the appended claims should not necessarily be limited to the description of the preferred versions contained herein.

What is claimed is:

1. An apparatus for powering and controlling an auxiliary load from an automatic lighting fixture, the fixture having a support structure and a control module removably mounted thereto, the control module having an input connection for receiving electrical power from a source of power and an output connection for periodically delivering the power to a main load of the fixture in a drive cycle, the apparatus comprising:
   (a) a housing for mounting between the support structure and the control module;
   (b) means in the housing for extending the source of power to the input connection;
   (c) means in the housing for returning the output connection to the main load;
   (d) means for connecting the auxiliary load to the source of power; and
   (e) means for interrupting the connecting means during a predetermined period of time in each cycle.

2. The apparatus of claim 1 wherein the interrupting means comprises a continuously running clock timer.

3. The apparatus of claim 1 wherein the interrupting means is connected to the returning means for preventing operation of the auxiliary load except during operation of the main load.

4. The apparatus of claim 3 wherein the interrupting means comprises a delay timer connected to the returning means, the delay timer interrupting the connecting means beginning at a predetermined period of time following commencement of operation of the main load.

5. The apparatus of claim 1 wherein the fixture includes a first socket on the structure and a first plug on the the control module, the power source and the main load being connected between the structure and the control module through the first socket and the first plug, the apparatus further comprising:
   (a) a second plug on the housing for engaging the first socket;
   (b) a second socket on the housing for engaging the first plug,
   wherein the extension means and the returning means comprise respective conductors connected between the second plug and the second socket.

6. An apparatus for powering and controlling an auxiliary load from an automatic lighting fixture, the fixture having a support structure and a control module removably mounted thereto, the control module having a first plug for engaging a first socket on the structure, the control module receiving electrical power from a power source and periodically delivering the power to a main load of the fixture in a main drive cycle, the power source and the main load being connected between the structure and the control module through the first socket and the first plug, the apparatus comprising:
   (a) a housing for mounting between the support structure and the control module;
   (b) a second socket on the housing for engaging the first plug;
   (c) a second plug on the housing for engaging the the first socket;
   (d) a first conductor for connecting the source of power from the second plug to the second socket;
   (e) a second conductor for connecting the main load from the second socket to the second plug;
   (e) means for connecting the auxiliary load to the source of power; and
   (f) means for interrupting the connecting means during a predetermined period of time in each cycle.

7. A method for converting an automatic lighting fixture to power and control an auxiliary load, the fixture having a support structure and a control module removably mounted thereto, the control module having a first plug for engaging a first socket on the structure, the control module receiving electrical power from a power source and periodically delivering the power to a main load of the fixture in a main drive cycle, the power source and the main load being connected between the structure and the control module through the first socket and the first plug, the method comprising the steps of:
   (a) selecting an apparatus comprising:
      (i) a housing;
      (ii) a second socket on the housing for engaging the first plug;
      (iii) a second plug on the housing for engaging the first socket;
      (iv) a first conductor for connecting the source of power from the second plug to the second socket;
      (v) a second conductor for connecting the main load from the second socket to the second plug;
      (vi) an auxiliary socket on the housing and connected between the first and second conductors; and
      (vii) means for interrupting the connection to the auxiliary socket during a predetermined period of time in each cycle;
   (b) removing the control module from the fixture;
   (c) attaching the apparatus to the fixture by connecting the second plug to the first socket;
   (d) attaching the control module to the apparatus by connecting the first plug to the second socket; and
   (e) connecting the auxiliary load to the auxiliary socket.

8. A method for powering and controlling an auxiliary load from an automatic lighting fixture, the fixture having a support structure and a control module removably mounted thereto, the control module having a first plug for engaging a first socket on the structure, the control module receiving electrical power from a power source and periodically delivering the power to a main load of the fixture in a main drive cycle, the power source and the main load being connected between the structure and the control module through the first socket and the first plug, the method comprising the steps of:
   (a) feeding the power to the control module through a housing, the housing having a second socket engaging the first plug and second plug engaging the first socket;
   (b) feeding the main load through the housing from the control module between second socket and the second plug;
   (c) feeding the auxiliary load with power from within the housing; and
   (d) interrupting the power to the auxiliary load during a predetermined period of time in each main drive cycle.

9. The method of claim 8 wherein the predetermined period of time in the step of interrupting the power comprises substantially all of the time that the main load is not receiving power.

10. The apparatus of claim 6 wherein the predetermined period of time comprises substantially all of the time that the main load is not receiving power.

* * * * *